(12) United States Patent
Boucher et al.

(10) Patent No.: US 12,359,956 B2
(45) Date of Patent: Jul. 15, 2025

(54) CAR WASH ADDITIVE MONITORING

(71) Applicant: Franklin Fueling Systems, LLC, Madison, WI (US)

(72) Inventors: Randall Boucher, Saco, ME (US); Vitaliy Demin, Saco, ME (US); Danny Norton, Saco, ME (US)

(73) Assignee: Franklin Fueling Systems, LLC, Madison, WI (US)

( * ) Notice: Subject to any disclaimer, the term of this patent is extended or adjusted under 35 U.S.C. 154(b) by 282 days.

(21) Appl. No.: 18/179,276

(22) Filed: Mar. 6, 2023

(65) Prior Publication Data

US 2023/0280198 A1    Sep. 7, 2023

Related U.S. Application Data

(60) Provisional application No. 63/385,329, filed on Nov. 29, 2022, provisional application No. 63/357,910, filed on Jul. 1, 2022, provisional application No. 63/317,509, filed on Mar. 7, 2022.

(51) Int. Cl.
*G01F 23/16* (2006.01)

(52) U.S. Cl.
CPC .................................. *G01F 23/165* (2013.01)

(58) Field of Classification Search
CPC ...... G01F 23/165; G01F 23/168; G01F 23/18; G01F 23/162; G01F 23/166; G01F 23/167
USPC .......... 73/290 R, 298–302, 432.1; 134/1, 18, 134/26, 29, 32, 45, 56 R, 123; 15/53.1; 340/618–624
See application file for complete search history.

(56) References Cited

U.S. PATENT DOCUMENTS

| | | | | | |
|---|---|---|---|---|---|
| 3,470,902 | A | * | 10/1969 | Hackman | F04F 5/48 417/187 |
| 4,422,327 | A | * | 12/1983 | Anderson | G01F 23/167 137/874 |
| 4,638,662 | A | * | 1/1987 | Watson | G01M 3/3245 73/302 |
| 5,678,593 | A | | 10/1997 | Lockhart | |
| 6,252,499 | B1 | * | 6/2001 | Gerdtz | G01F 23/804 340/936 |
| 6,931,926 | B1 | * | 8/2005 | Van Ee | G01N 9/28 73/299 |
| 9,389,114 | B2 | | 7/2016 | Rietsch et al. | |

(Continued)

FOREIGN PATENT DOCUMENTS

EP    3098576 A1    11/2016
WO    2016/193174 A1    12/2016

OTHER PUBLICATIONS

Carwash Chemicals 101, Professional Carwashing & Detailing, by Meagan Kusek, dated May 29, 2018.

(Continued)

*Primary Examiner* — Robert R Raevis
(74) *Attorney, Agent, or Firm* — Faegre Drinker Biddle & Reath LLP

(57) ABSTRACT

A car wash additive measuring system and method use a bubbler which provides a flow of pressurized gas through each bulk container. A pressure of each individual flow of pressurized gas is measured by a pressure transducer to output a signal indicative of the level of additive stored in the container. Flow rates of the respective flow of pressurized gas may be adjusted to accommodate particular additives.

22 Claims, 14 Drawing Sheets

(56) References Cited

U.S. PATENT DOCUMENTS

2004/0220817 A1    11/2004   Sanville et al.
2011/0192433 A1     8/2011   Harris et al.
2021/0165429 A1     6/2021   Brunskill

OTHER PUBLICATIONS

Extended European Search Report, European Application No. 23160391.1, dated Jul. 14, 2023, 9 pages.

* cited by examiner

CAR WASH ADDITIVE MONITORING

CROSS-REFERENCE TO RELATED APPLICATIONS

This application claims the benefit of U.S. Provisional Patent Application No. 63/385,329, filed Nov. 29, 2022, U.S. Provisional Patent Application No. 63/317,509, filed Mar. 7, 2022, and U.S. Provisional Patent Application No. 63/357,910, filed Jul. 1, 2022, the entire disclosures of which are all expressly incorporated by reference herein.

FIELD

The present disclosure is directed to car wash additive monitoring. More particularly, the present disclosure provides systems and methods for monitoring the amount of each carwash fluid chemical (additive(s)) available to dispense.

BACKGROUND

A variety of additives are used in car washes as cleaners, pre-soak/rinse, sealant/protective and waxing agents, for example. These additives are stored in bulk containers and are drawn from the bulk containers to be mixed with water to create aqueous solutions for application to vehicles during a car wash run cycle. Drive-through car washes, for example, would benefit from the system of the present disclosure.

SUMMARY

The present disclosure provides a method and apparatus for monitoring the level of each car wash additive stored in a bulk container for use during a car wash run cycle. The monitoring apparatus and method use a bubbler which provides a flow of pressurized gas through each bulk container. A pressure of each individual flow of pressurized gas is measured by a pressure transducer to output a signal indicative of the level of additive stored in the container. Flow rates of the respective flow of pressurized gas may be adjusted to accommodate particular additives.

The disclosure, in one form thereof, provides a car wash, including a plurality of containers, each of the plurality of containers containing a liquid additive for dispensing in the car wash, a source of a pressurized gas, a manifold receiving a flow of the pressurized gas and partitioning the flow of the pressurized gas into a plurality of partitioned flows, a plurality of dip tubes, each dip tube extending into one of the plurality of containers and terminating at an exit orifice near a floor of a corresponding one of the plurality of containers, each of the partitioned flows distributed by the manifold to a corresponding one of the plurality of dip tubes and exiting the one of the plurality of dip tubes at the exit orifice of the one of the plurality of dip tubes, at least one pressure sensor in fluid communication the plurality of dip tubes and operable to sense a sensed pressure of each one of the plurality of dip tubes, whereby the at least one pressure sensor senses a back pressure in the plurality of containers, and a processor receiving the sensed pressure from each of the plurality of dip tubes and programmed to calculate a height of the liquid additive in each of the plurality of containers.

In one aspect, the at least one pressure sensor includes a plurality of pressure sensors, each of the plurality of pressure sensors in fluid communication with a corresponding one of the plurality of dip tubes and operable to sense the sensed pressure of the one of the plurality of dip tubes, whereby each of the plurality of pressure sensors senses the back pressure in a corresponding one of the plurality of containers. Each of the plurality of pressure sensors may include or be a pressure transducer.

In another aspect, each of the plurality of containers is a vented bulk container.

In another aspect, the source of the pressurized gas includes or is a pressure regulator.

In another aspect, the manifold includes a pressure relief valve.

In another aspect, the manifold includes a distribution conduit in fluid communication with the source of the pressurized gas to receive the flow of the pressurized gas. The manifold further includes a plurality of pressure regulating orifices in fluid communication with the distribution conduit, each of the plurality of pressure regulating orifices in fluid communication with a corresponding one of the plurality of dip tubes, each of the plurality of pressure regulating orifices respectively positioned intermediate the distribution conduit and a corresponding one of the plurality of dip tubes. Each of the plurality of pressure regulating orifices may provide a substantially equal flow rate therethrough. At least one adjustable flow metering valve may be included, and at least one of the plurality of pressure regulating orifices may provide a variable flow rate therethrough. The variable flow rate may be manually adjustable. The variable flow rate may be adjustable by a needle valve which is configured to be advanced or retracted relative to a valve seat by adjustment of a screw. The variable flow rate may be automatically adjustable. The processor may be programmed to electronically adjust the automatically adjustable variable flow rate.

In yet another aspect, an enclosure may be included housing a printed circuit board supporting the processor. The at least one pressure sensor may be a plurality of pressure sensors mounted on the printed circuit board for communication with the processor. The manifold may be mounted to the enclosure, and the car wash may further include a plurality of sensor conduits. Each of the plurality of sensor conduits may be in fluid communication with a corresponding one of the plurality of dip tubes. Each of the plurality of sensor conduits may be fluid communication with the distribution conduit downstream from a corresponding one of the plurality of pressure regulating orifices. Each of the plurality of pressure sensors may be fluid communication with a corresponding one of the plurality of sensor conduits. The plurality of sensor conduits may be housed in the enclosure.

In another aspect, the processor is communicatively connected to a web server to facilitate remote communication of the height of the liquid additive in each of the plurality of containers.

In another aspect, the liquid additive in a first one of the plurality of containers includes at least one of a presoak, a bug wash, a glass cleaner and vision guard, a tire cleaner or dressing, a wheel/rim cleaner or dressing, a soap, a shampoo, a foam including conditioner or polish, a detergent, a wax, a drying agent, a rinse agent, a clear coat, a paint sealant, a protectant, an underbody rust inhibitor, a rain coat, and another car wash fluid. The liquid additive in a second one of the plurality of containers may include another of a presoak, a bug wash, a glass cleaner and vision guard, a tire cleaner or dressing, a wheel/rim cleaner or dressing, a soap, a shampoo, a foam including conditioner or polish, a detergent, a wax, a drying agent, a rinse agent, a clear coat, a paint sealant, a protectant, an underbody rust inhibitor, a rain coat, and another car wash fluid. The liquid additive in a third one of the plurality of containers may include yet another of a presoak, a bug wash, a glass cleaner and vision guard, a tire cleaner or dressing, a wheel/rim cleaner or dressing, a soap, a shampoo, a foam including conditioner or polish, a detergent, a wax, a drying agent, a rinse agent, a clear coat, a paint sealant, a protectant, an underbody rust inhibitor, a rain coat, and another car wash fluid.

In another form thereof, the present disclosure provides a car wash including at least one chemical container, a bubbler, and a controller receiving at least one input from the bubbler and being operable to determine a level of a liquid chemical in the at least one chemical container.

In one aspect, the at least one input from the bubbler comprises a back pressure in a dip tube.

In yet another form thereof, the present disclosure provides a method of operating a car wash system. The method includes placing a plurality of dip tubes into a corresponding plurality of containers, in which each of the plurality of containers contain liquid additive for dispensing in the car wash system, and each of the plurality of dip tubes extend into a corresponding one of the plurality of containers and terminating at an exit orifice near a floor of the one of the plurality of containers. The method further includes connecting the plurality of dip tubes to a source of a pressurized gas, partitioning a flow of the pressurized gas into a plurality of partitioned flows each flowing to a corresponding one of the plurality of dip tubes, measuring a pressure within each of the plurality of dip tubes such that a back pressure in each corresponding one of the plurality of containers is determined, and calculating a height of the liquid additive in each of the plurality of containers.

In one aspect, the method further includes varying at least one of the plurality of partitioned flows using a variable pressure orifice operably disposed between the source of the pressurized gas and at least one of the plurality of dip tubes. The step of varying may be based on at least one of a thixotropy of the liquid additive, a foaming potential of the liquid additive, and a surface tension of the liquid additive. The step of varying may include varying an orifice size of the variable pressure orifice inversely to at least one of the thixotropy of the liquid additive, a foaming potential of the liquid additive, and a surface tension of the liquid additive.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Figure 1:
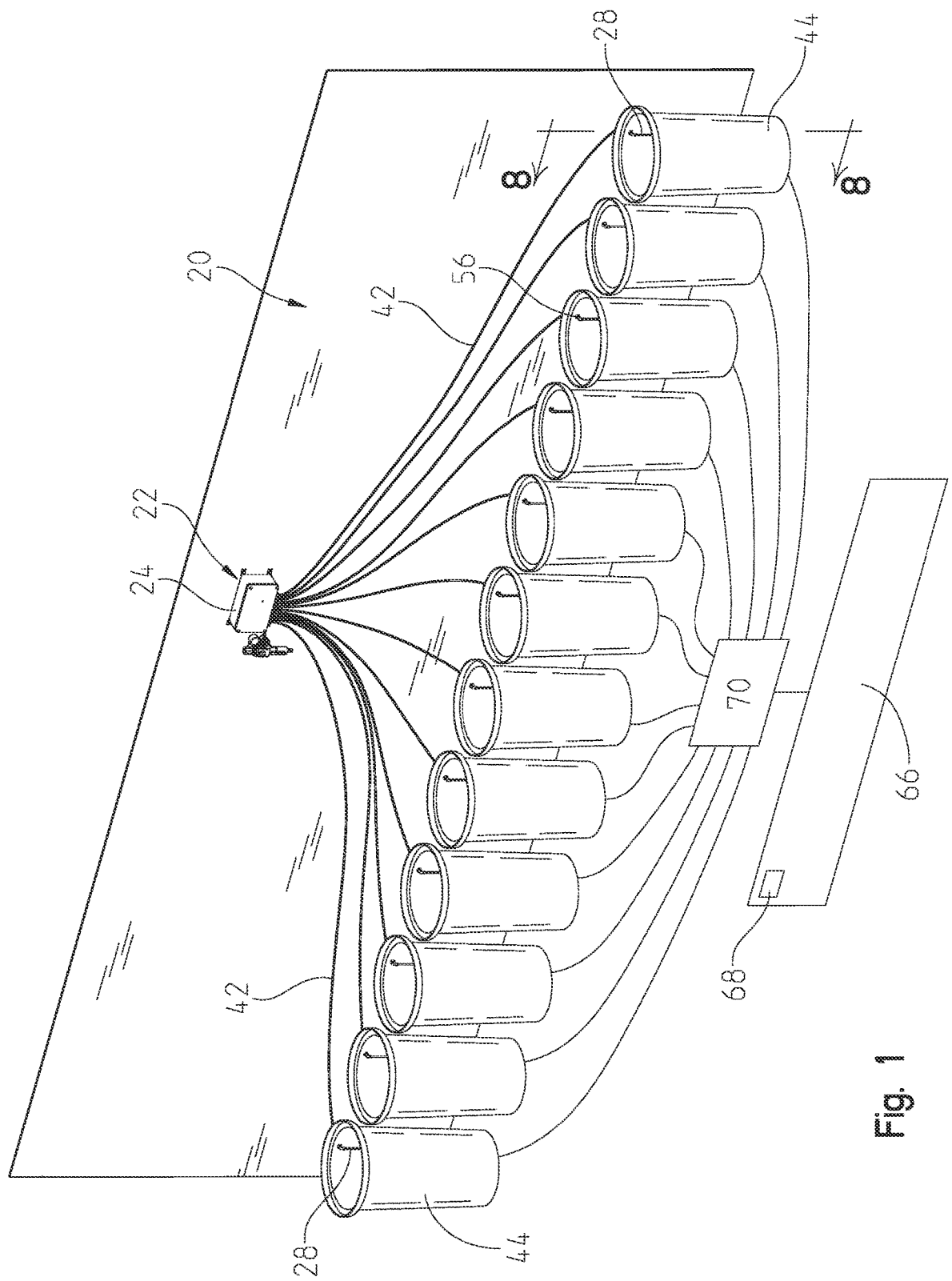
FIG. 1 is a perspective view of a monitor for monitoring the level of each additive available for use in a car wash.

Corresponding reference characters indicate corresponding parts throughout the several views. The exemplification set out herein illustrates an embodiment of the invention, the embodiment disclosed below is not intended to be exhaustive or to be construed as limiting the scope of the invention in any manner.

DETAILED DESCRIPTION

FIGS. 1-9 illustrate monitor 20 of the present disclosure. A number of the elements of monitor 20 of the present disclosure are duplicated, as is clearly seen in the illustrations. For example, numerous bulk containers 44 are shown in FIG. 1. In many instances only one (or a few) of a duplicated element is numbered to avoid making the drawings unnecessarily cumbersome.

Figure 3:
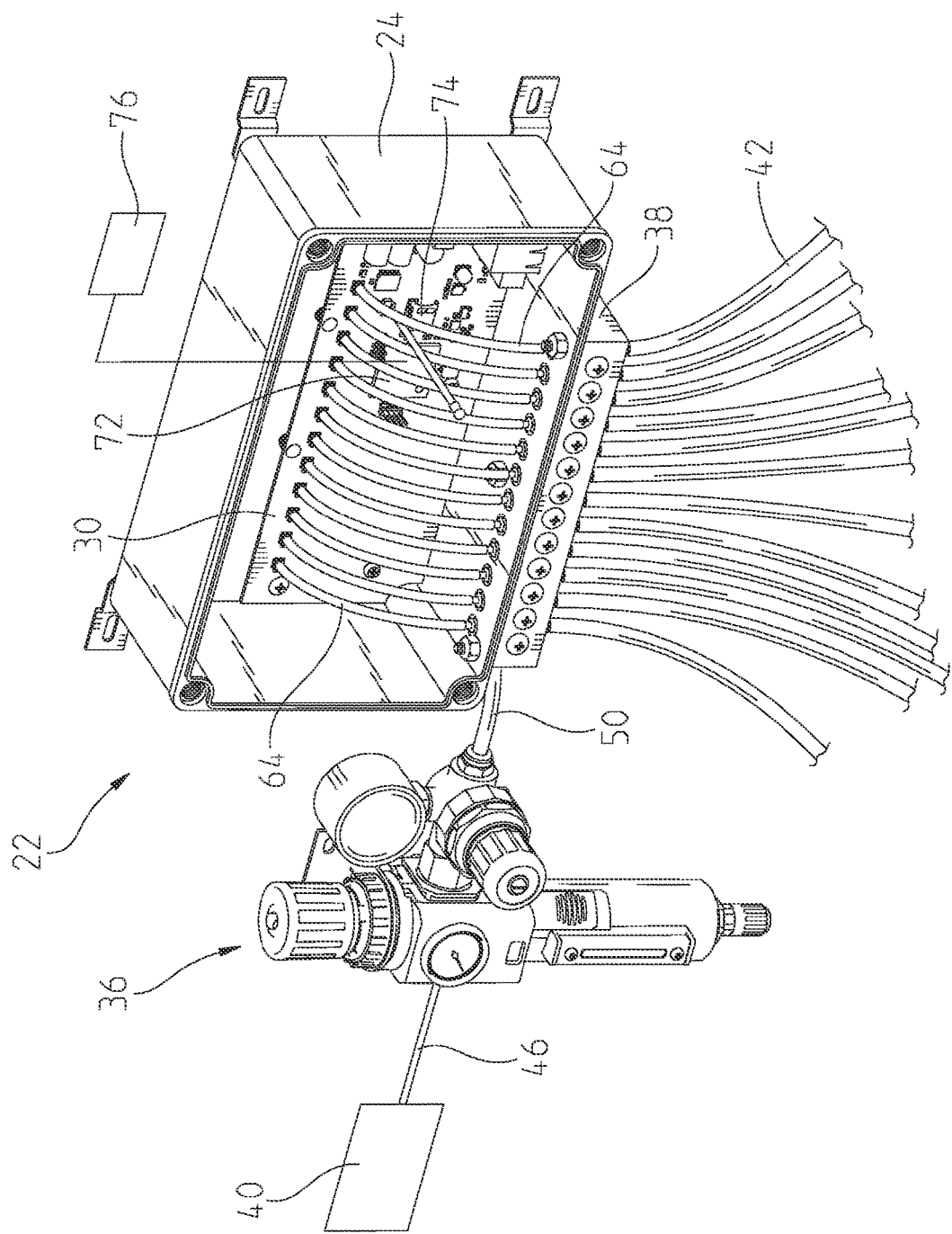
FIG. 3 is a partial perspective view illustrating the control for the monitor of FIG. 1, with the control box cover removed.
Figure 4:
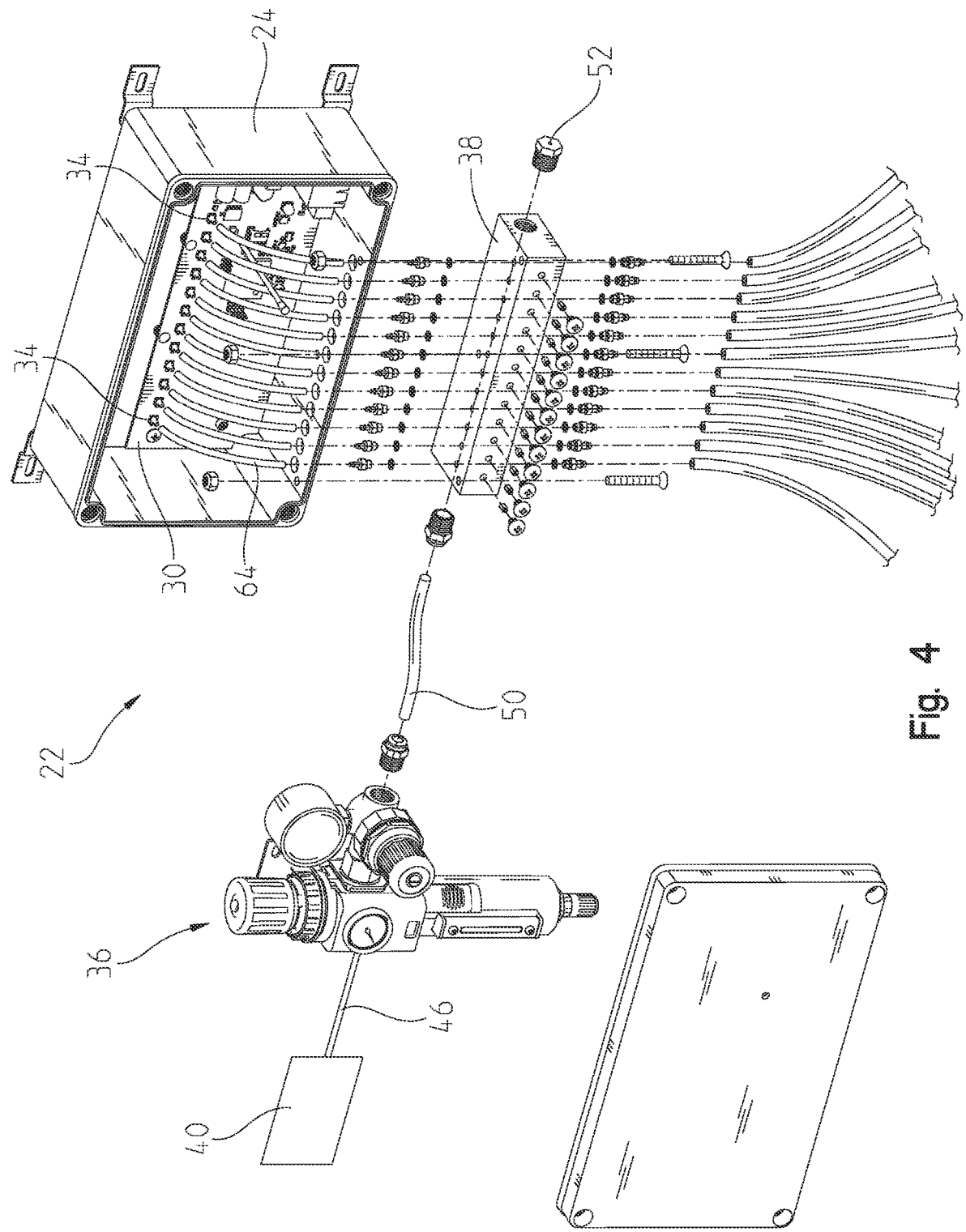
FIG. 4 is a perspective, exploded view of the control for the monitor of FIG. 1.

Referring to FIG. 1, monitor 20 includes control 22. Referring to FIGS. 3 and 4 (which show control box cover 26 removed), control 22 includes an enclosure or housing, such as control box 24, which houses printed circuit board (PCB) 30 or another suitable electronic controller, sensor conduit 64, and pressure transducers 34. Control 22 further includes pneumatic manifold 38 secured to control box 24, pressure regulator assembly 36, and source of pressurized gas 40. The pressurized gas provided by source 40 may be air, or any other non-flammable gas as required or desired for a particular application. One example of a non-air, non-flammable gas which may be used in accordance with the present disclosure is nitrogen. Pressure regulator assembly 36 may be a single stage regulator using a single pressure regulator, or may be a multi-stage regulator using two or more pressure regulators arranged in series. For purposes of the present discussion, a "manifold" can be any chamber branching into several openings and configured to distribute an incoming flow of fluid (e.g., pressurized gas) into a plurality of outgoing flows of the fluid.

Monitor 20 further includes pneumatic tubing 42 extending between pneumatic manifold 38 and each of the plurality of containers 44 shown in FIG. 1. Particularly, pneumatic tubing 42 fluidly connects pneumatic manifold 38 to dip tubes 28. As described in further detail below, airflow (or other gaseous flow) from source of pressurized gas 40 is provided near the bottom of each container 44 so that pressure transducers 34 can be utilized to provide a pressure reading indicative of the level of additive in each container 44.

For purposes of the present discussion, containers 44 are referred to as "bulk" containers, in that each container 44 is sized to contain a bulk quantity of liquid for a car wash application as described herein.

Source of pressurized gas 40, such as a compressor, provides pressurized airflow (although alternative gases such as nitrogen could be used, air will hereafter be described in this detailed description) via supply conduit 46 to pressure regulator assembly 36. Pressure regulator assembly 36 provides airflow at a consistent airflow pressure to pneumatic manifold 38 through manifold conduit 50. Pressure regulator assembly 36 will be set to provide airflow through manifold conduit 50 at a pressure within the range of 4-10 pounds per square inch (PSI). For example, pressure regulator assembly 36 can provide airflow through manifold conduit 50 at a pressure of any of 4, 4.5, 5, 5.5, 6, 6.5, 7, 7.5, 8, 8.5, 9, 9.5, or 10 PSI. For purposes of the present disclosure, pressures expressed in "PSI" are gauge pressures measured relative to ambient atmospheric pressure, typically denoted as "PSIG".

Airflow through manifold conduit 50 is first provided to distribution conduit 48 of pneumatic manifold 38. At the end of distribution conduit 48 opposite manifold conduit 50 is pressure relief valve 52. Pressure relief valve 52 will exhaust pressure from distribution conduit 48 at pressures above 10 PSI. Air pressure within distribution conduit 48 is provided to each pressure regulating orifice 54. Each pressure regulating orifice 54 constricts the size of the flow path for gas coming from manifold 38, thereby regulating both the pressure and flow rate of the gas therethrough as a function of the inlet pressure and orifice size. For concision, "pressure regulating orifice 54" is referenced herein, it being understood that both pressure and flow are affected by orifice 54. The orifice size may be within a range of 0.004 inches to 0.007 inches inner diameter. With manifold conduit 50 receiving air at the previously described pressures, each pressure regulating orifice 54 can supply each length of pneumatic tubing 42 an air pressure of up to 5 PSI (for example, any of 0.5, 1.0, 1.5, 2.0, 2.5, 3.0, 3.5, 4.0, 4.5, or 5.0 PSI), which will then be supplied via an elbow 56 to each dip tube 28. Accounting for the losses experienced at elbow 56, the pressure in each dip tube 28 will be sufficient to overcome the back pressure of a bulk container 44 completely full of any of the contemplated liquid additives.

Figure 2:
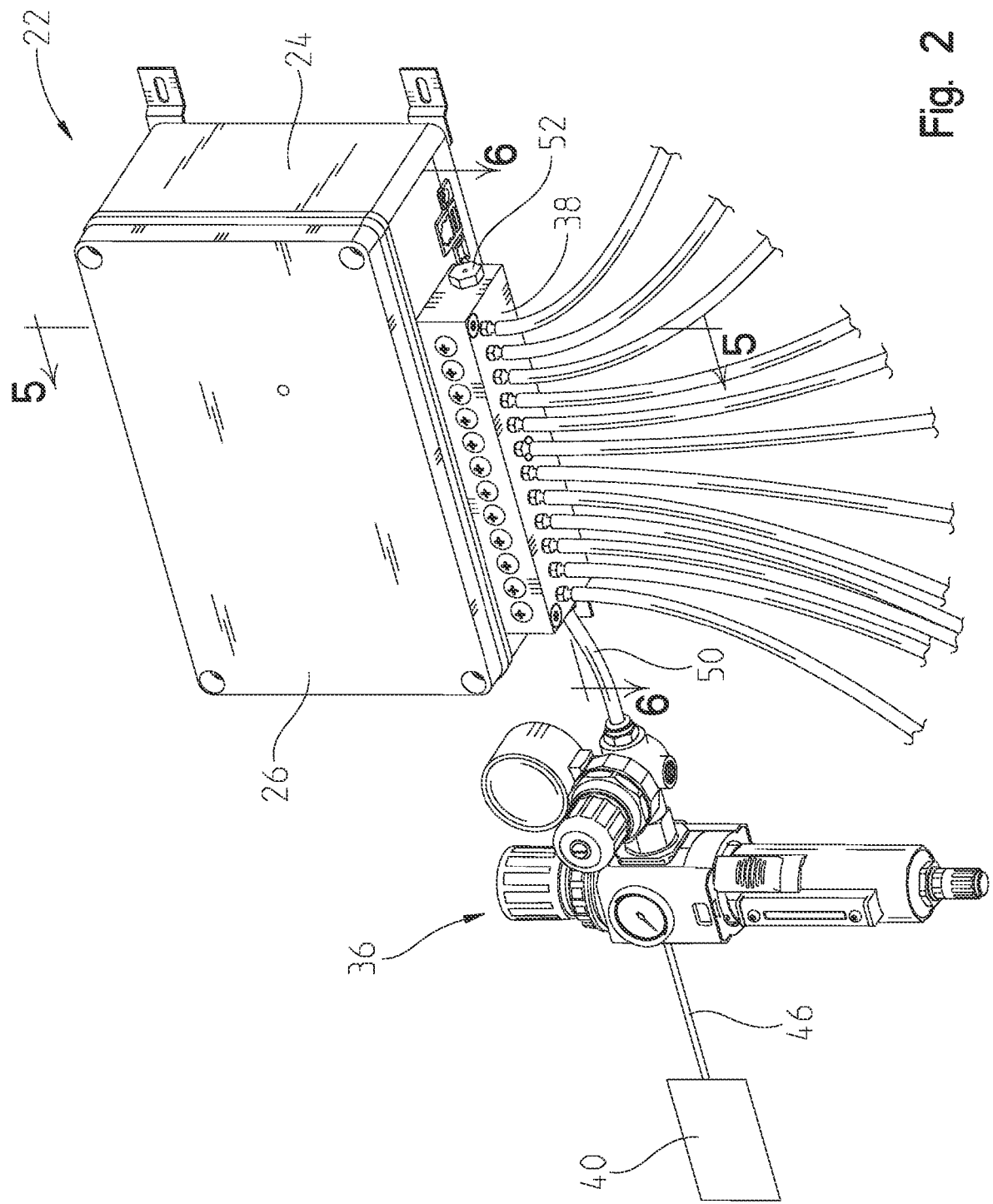
FIG. 2 is a partial, perspective view illustrating the control for the monitor of FIG. 1.

FIGS. 2-4 illustrate a length of tubing 42 extending from each of the exhaust orifices of manifold 38. That is, all twelve of the monitored flows of gas are illustrated to be in use, in conjunction with twelve separate containers 44 as shown in FIG. 1. In some applications, less than all of the orifices in manifold 38 may be utilized. For example, a plug may be provided in place of the fitting for tubing 42 to prevent any flow through the plugged opening in the manifold 38. This facilitates expansion of monitor 20 in an existing installation. For example, if manifold 38 is provided with a series of plugged orifices in manifold 38, a car wash installation (e.g., car wash apparatus 66 of FIG. 1) can later be expanded to include additional containers 44, and these can be monitored by monitor 20 by simply removing the plugs and installing tubing 42 at that location. Moreover, although FIGS. 1-4 illustrate twelve monitored flows through containers 44, any number of potential monitored flows may be provided to meet an end user's needs for current or potential future numbers of containers 44 by simply increasing the number of pressure transducers 34 on PCB 30 (described further below) and the corresponding number of exhaust ports in manifold 38.

Figure 10:
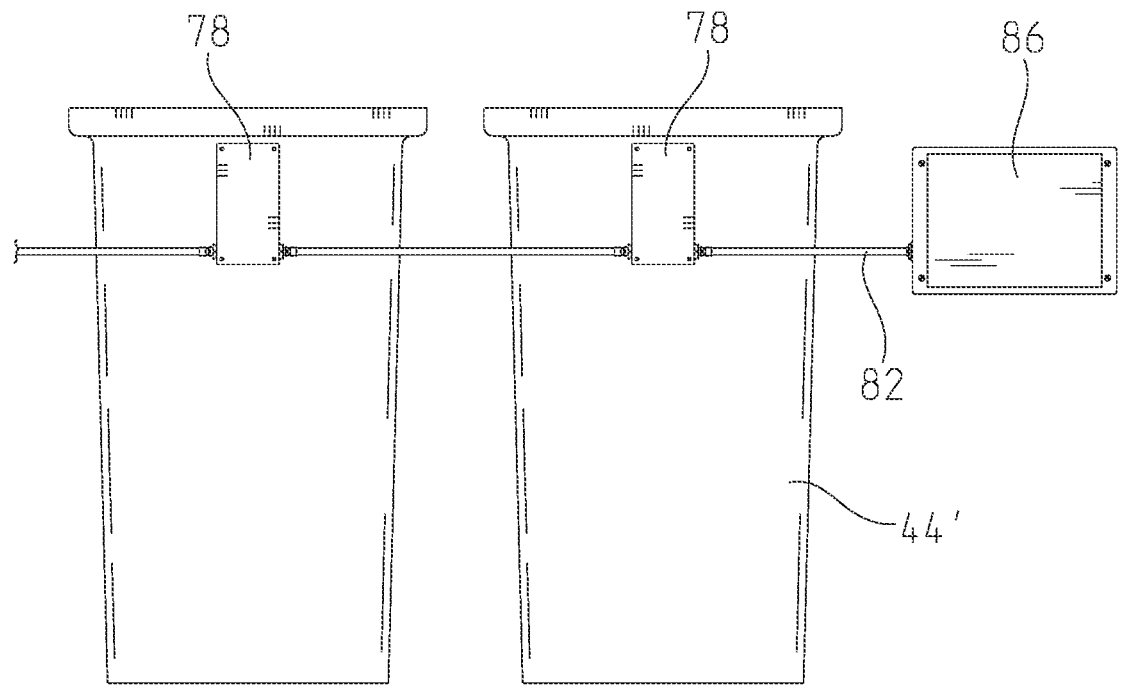
FIG. 10 is an elevational view of an alternative embodiment featuring a pressure sensor and processor locally associated with each bulk container.
Figure 11:
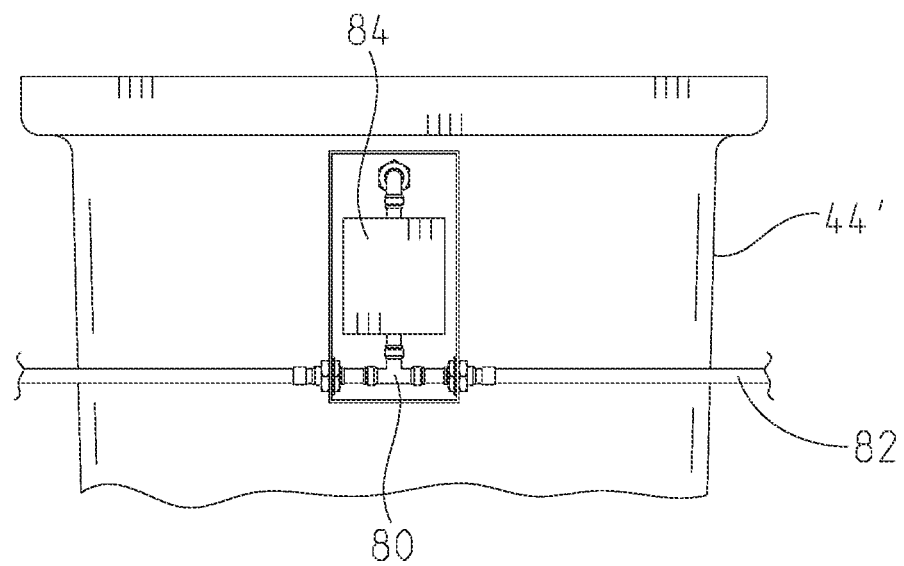
FIG. 11 is a partial, elevational view of the alternative embodiment of FIG. 10 showing the local control box with its cover removed.
Figure 12:
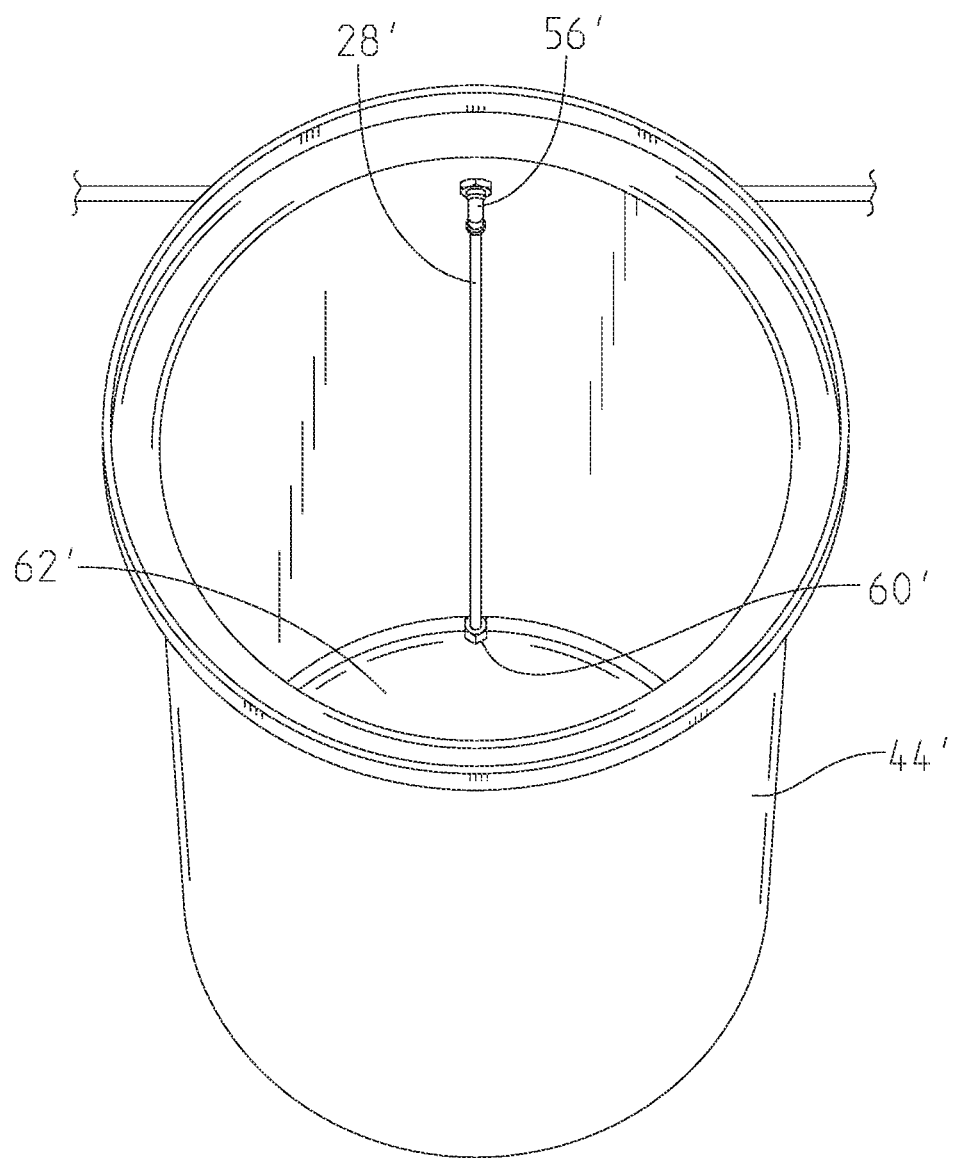
FIG. 12 is a perspective view of a bulk container of the embodiment of FIGS. 10 and 11.

Conversely, the number of pressure transducers 34 may be reduced by using one pressure transducer to monitor more than one container 44. For example, a single pressure transducer 34 may be placed in fluid communication with a selected one of the containers 44 via tubing 42, as described in detail above, such that the single pressure transducer 34 may take a measurement for the selected container. A valve (not shown), such as a solenoid valve, may be functionally interposed between the tube 42 for the selected container and a second tube 42 for a second selected container. One such solenoid valve is shown in FIGS. 10-12 in connection with individual PCB 84, for example. When the solenoid valve is activated (e.g., by an electrical signal from PCB 30), the single pressure transducer 34 switches from fluid communication with the first selected container 44 to the second selected container 44 and thereby initiates a second measurement for the second selected container. In this way, the single pressure transducer 34 may serially monitor multiple containers 44, rather than using a dedicated pressure transducer 34 for each corresponding container 44 as shown in FIGS. 3-4 and described above. Using additional solenoid valves, any number of additional containers 44 may be monitored by the single pressure transducer 34. In one embodiment, the single pressure transducer 34 may be used to monitor all the containers 44 of monitor 20. Alternatively, the single pressure transducer 34 may be joined by one or more additional pressure transducers 34. In this way, monitor 20 may use any number of pressure transducers 34 to monitor any number of containers 44, including a single container 44, as required or desired for a particular car wash application.

Figure 5:
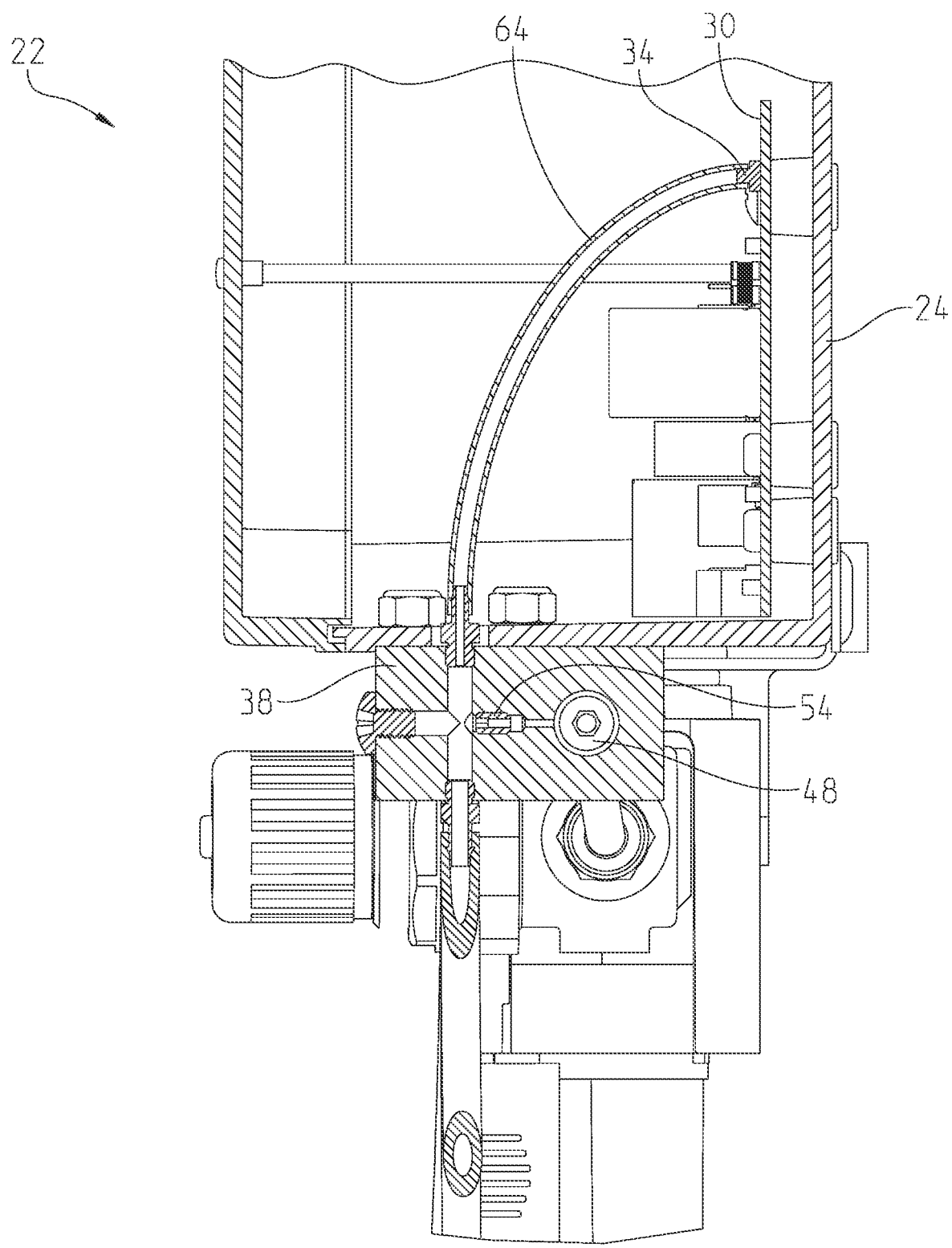
FIG. 5 is a sectional view taken along line 5-5 of FIG. 2.
Figure 6:
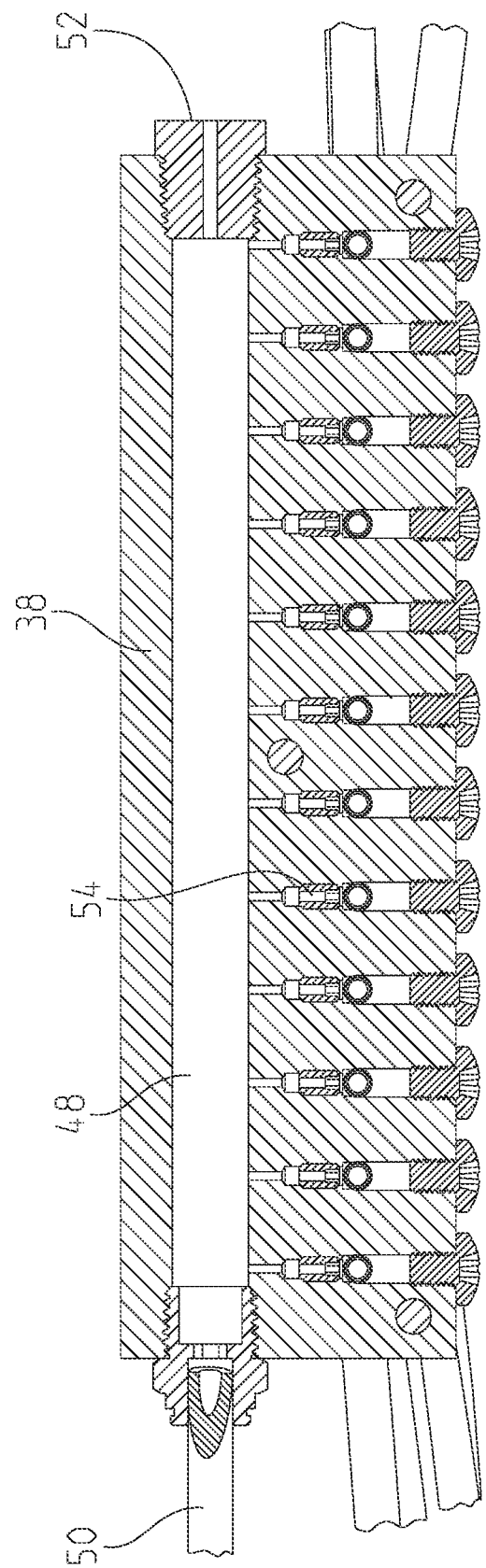
FIG. 6 is a sectional view taken along line 6-6 of FIG. 2.
Figure 7:
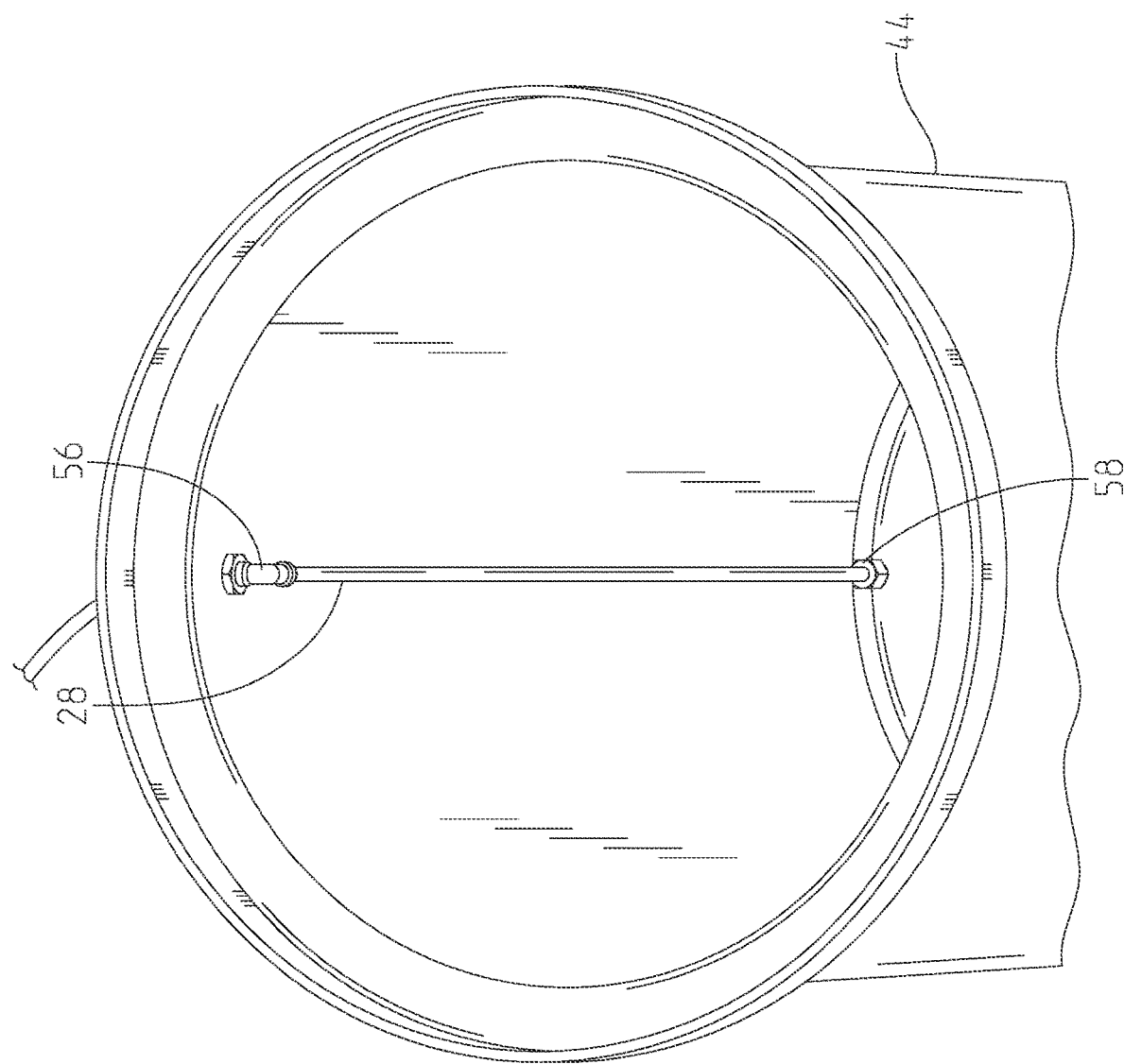
FIG. 7 is a perspective view of an additive container including a dip tube, which forms a part of the monitor shown in FIG. 1.
Figure 8:
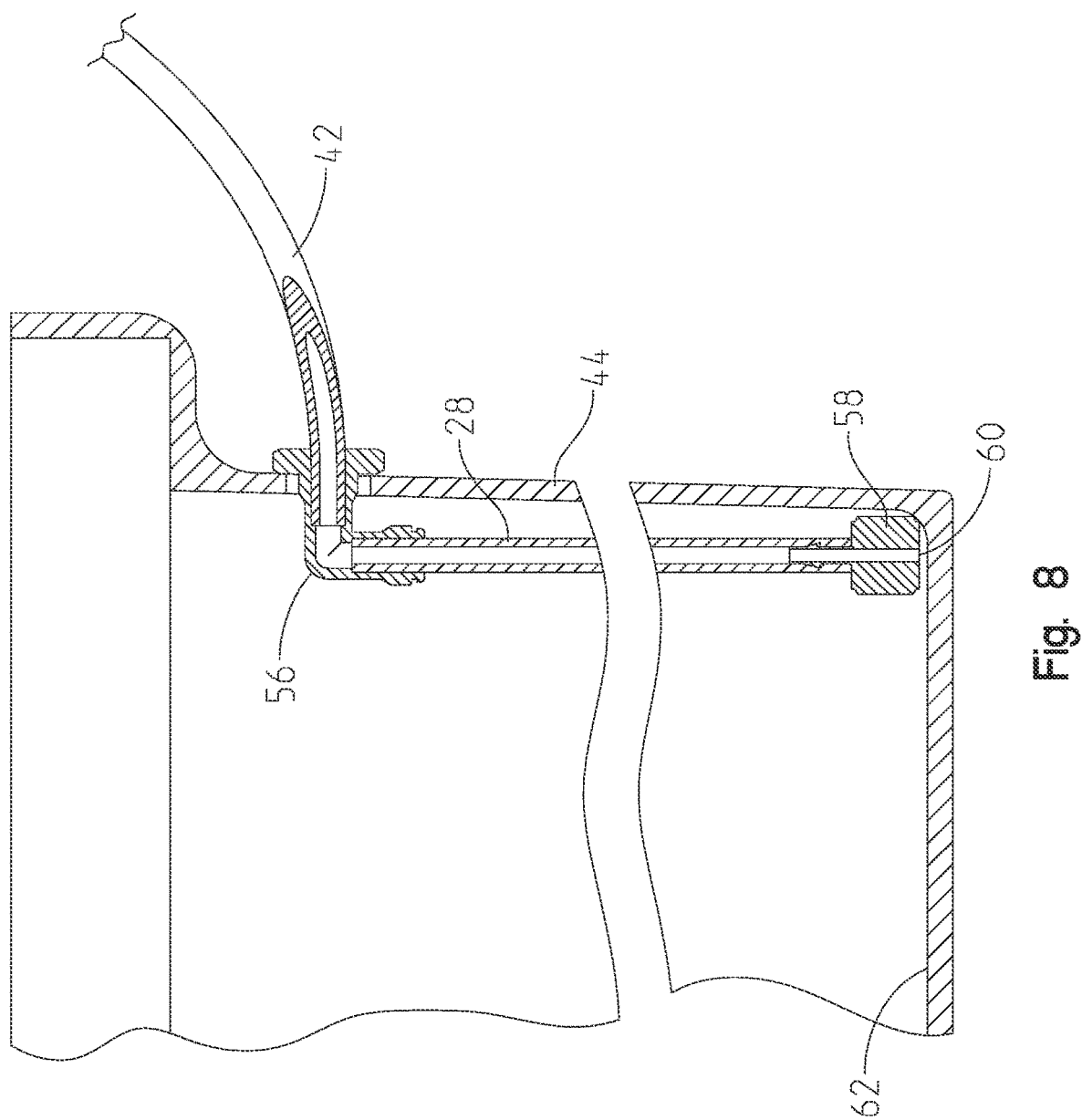
FIG. 8 is a partial sectional view taken along the longitudinal axis of the dip tube shown in FIG. 7.
Figure 9:
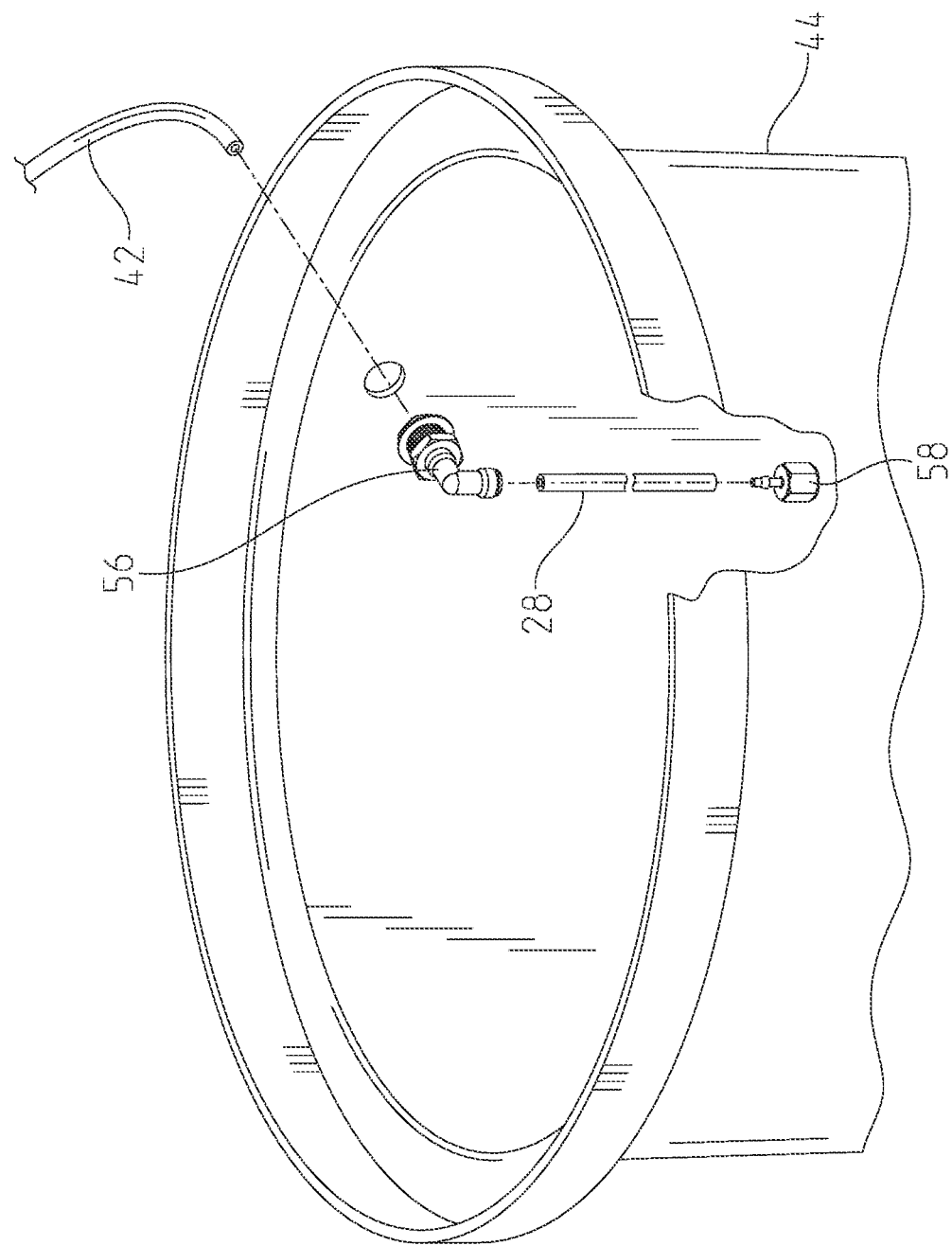
FIG. 9 is a partial, exploded, perspective view of the additive container and dip tube of FIG. 7.

In the illustrated embodiment of FIG. 5, each pressure regulating orifice 54 has an opening through which gas passes, and the size of this opening is fixed. However, a variable-size pressure regulating orifice is also contemplated, as shown in FIGS. 13-15 and further described below.

Figure 13:
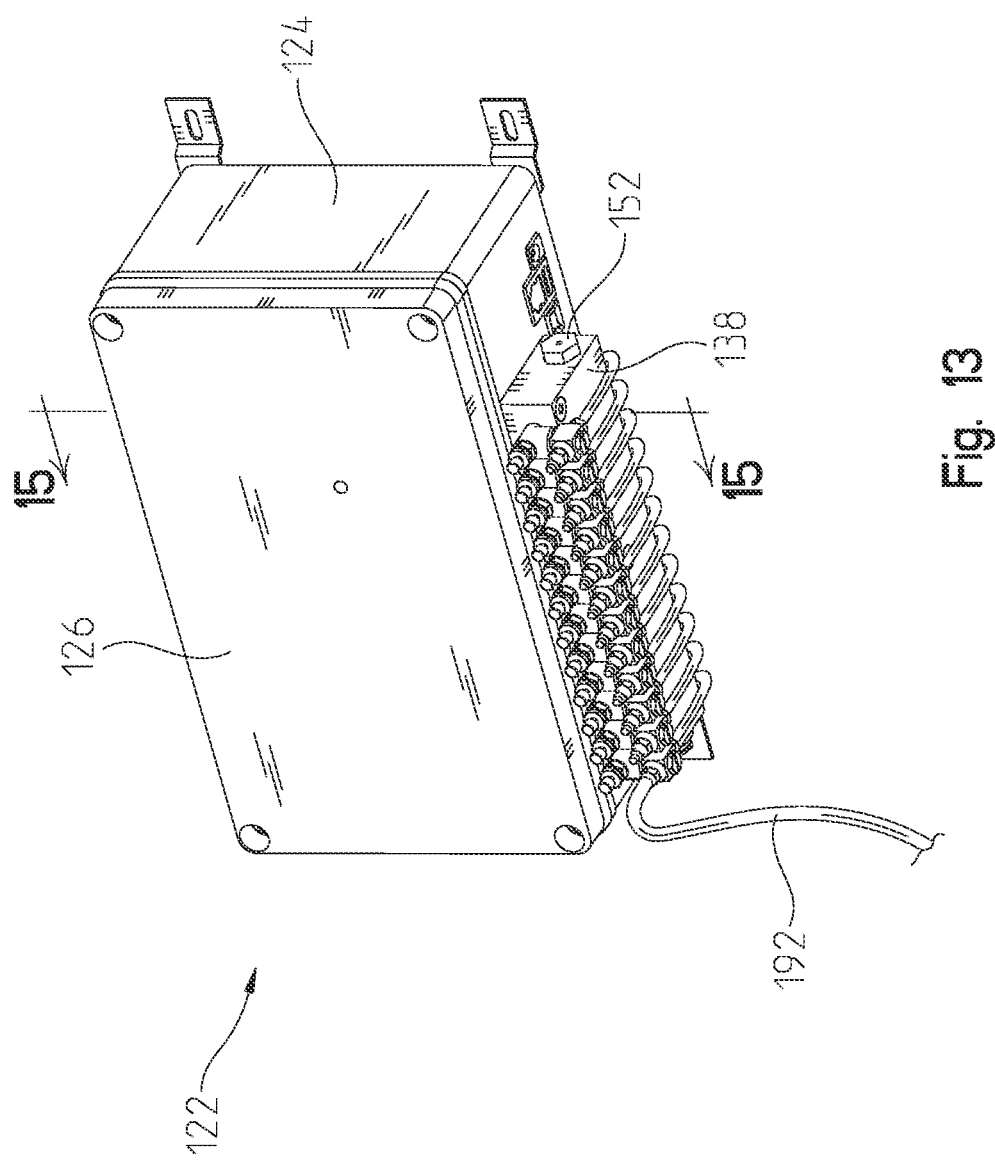
FIG. 13 is a partial, perspective view illustrating another control for the monitor of FIG. 1.
Figure 14:
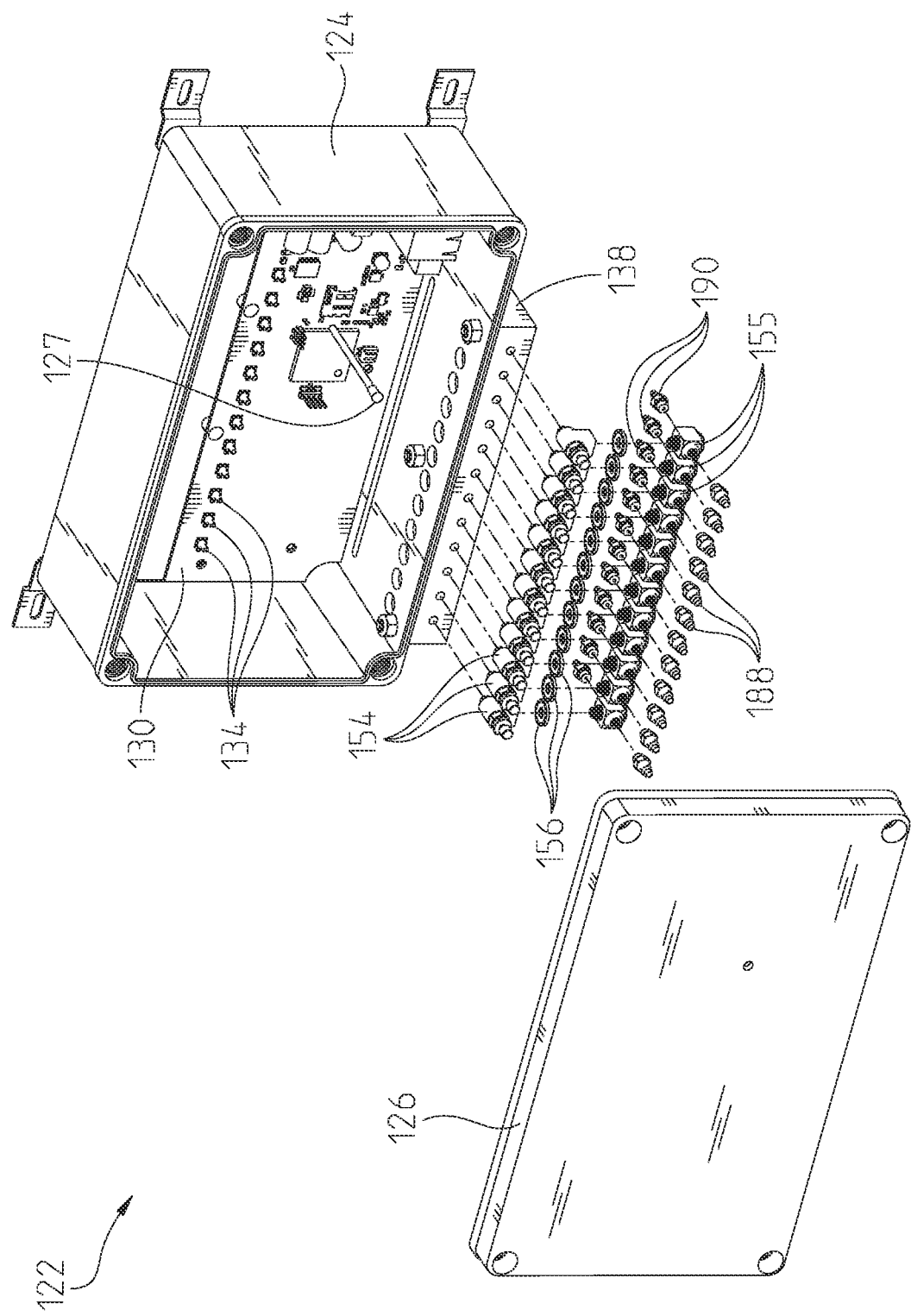
FIG. 14 is a perspective, exploded view of the control of FIG. 13.
Figure 15:
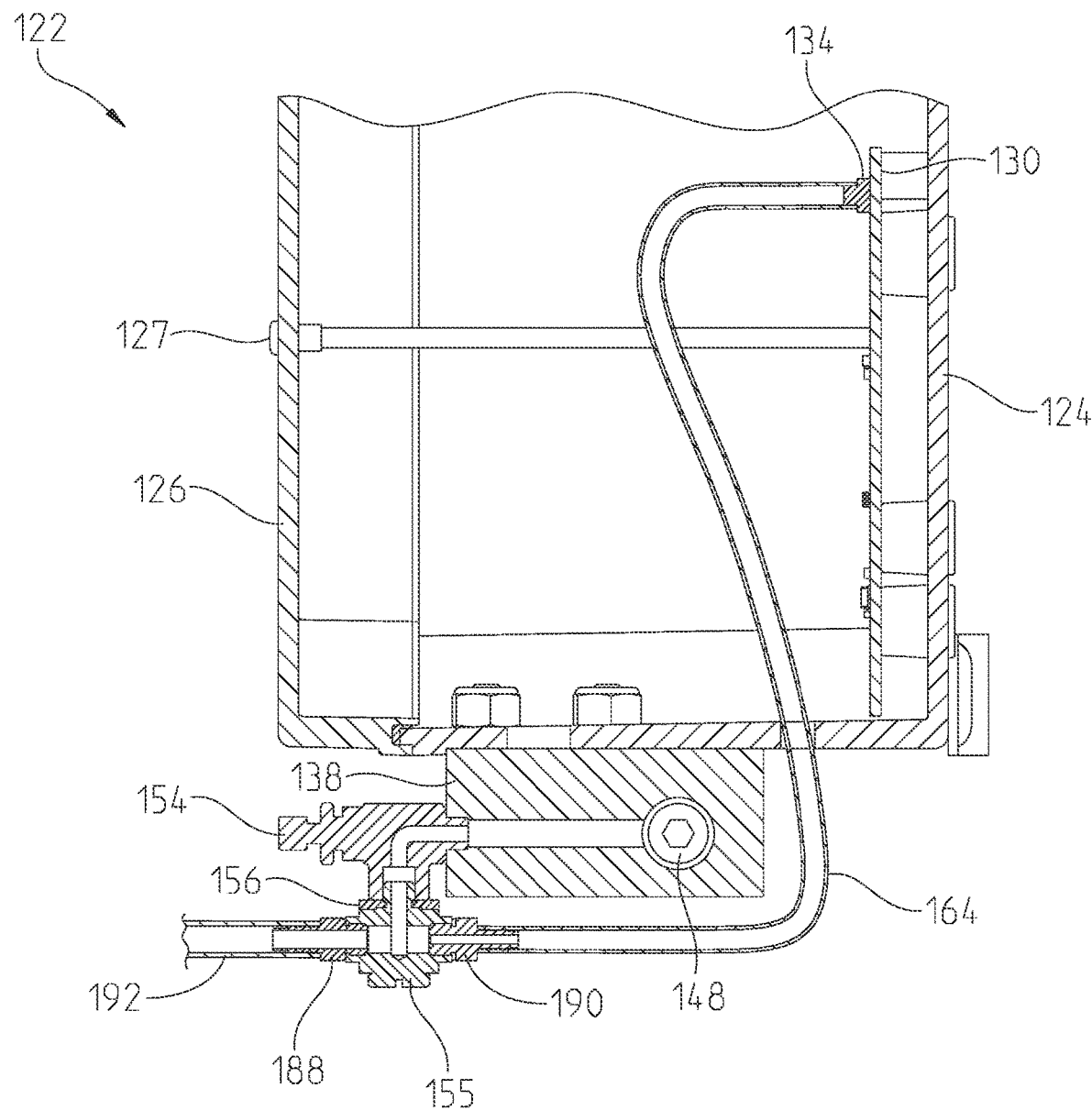
FIG. 15 is a sectional view taken along line 15-15 of FIG. 13.

FIGS. 13-15 illustrate control 122, which is similar to control 22 described above except with the addition of variable orifice sizes as further described below. For purposes of the present disclosure, control 122 may be used interchangeably with control 22, with cooperating structures and methods of use common to both designs. Additionally, components of control 122 share common reference numbers with their analogous components in control 22, except with 100 added thereto. All features, structures and applications pertaining to control 22 also pertain to control 122.

Control 122 includes manifold 138 which is generally similar in structure and function to manifold 38, including an input configured to receive a flow of gas through a manifold conduit (not shown) and distribute that flow of gas to various sensor conduits 164 and dip tubes 28 in a similar manner as discussed above. Manifold 138 also includes pressure relief valve 152 positioned and configured for the same function as valve 52. However, manifold 138 includes only a single distribution channel corresponding to each of the sensor conduits 64. Attached to each such distribution channel is an adjustable pressure regulating orifice assembly 154. By contrast to pressure regulating orifice 54 shown in FIG. 5 and described above, which has a fixed orifice size, pressure regulating orifice assembly 154 has a variable orifice size which allows a user of control 122 to vary the output volume of gas flowing through each of the conduits 164 for a given input pressure provided via the manifold conduit. In this way, each pressure regulating orifice assembly 154 is configured as an adjustable flow metering valve.

Pressure regulating orifice assembly 154 may be manually adjustable, such as by turning a screw accessible by the user to adjust the position of an internal needle valve. As the screw is turned in a first direction, the needle valve approaches a valve seat, restricting the area available for gas flow past the needle valve and thereby restricting the volume of gas flow for a given pressure. As the screw is turned in a second direction opposite the first direction, the needle valve advances away from the valve seat, expanding the area available for gas flow past the needle valve and thereby increasing the volume of gas flow for a given pressure. Alternatively, other manually- or automatically-adjustable valve structures may be used for pressure regulating orifice assembly 154. In the case of automatically-adjustable valves, the valve adjustment mechanism may be electronic, such that the gas flow opening is enlarged or restricted in proportion to a variable analog signal received from a processor, such as the processor of PCB 130 (FIG. 14), which may be similar to processor 72 described herein. Such analog signal may be a 0-10 VDC signal or a 4-20 mA signal, for example. Digital signals may also be used to adjust an electronically-adjustable valve adjustment mechanism, as required or desired for a particular application.

As best seen in FIG. 15, variable orifice assembly 154 may have a "T" fitting 155 attached to its output, and additional tube fittings 188, 190 may be connected to the fitting 155. A gasket 156 may be interposed between fitting 155 and a respective adjacent pressure regulating orifice assembly 154 to ensure a fluid-tight connection therebetween. Fitting 190 allows connection to a respective sensor conduit 164 which is in fluid communication with a respective pressure transducer 134, as described herein with respect to control 22. Fitting 188 allows connection to a distribution tube 192 which provides a partitioned flow of gas to a respective dip tube 28 as described herein with respect to control 22.

Adjustable orifices of the type provided by variable orifice assembly 154 allow for selective changes in the size of the orifice in order to accommodate desired increases or decreases in gas flow for a given expected input pressure. In the context of a car wash implementation of monitor 20, for example, fluid contained in bulk containers 44 may be thixotropic and may additionally be susceptible to persistent foaming. For such fluids, the orifice size provided by variable orifice assembly 154 may be constricted to mitigate viscosity reduction and/or formation of bubbles resulting from partitioned flows of gas through a respective dip tube 28. Conversely, fluids that are less thixotropic, have lower foaming potential, and/or have lower surface tension to allow bubbles to disperse faster, may utilize larger orifice sizes and concomitantly higher gas flows through variable orifice assembly 154. In this way, the orifice size may be said to be inversely proportional to the thixotropy, foaming potential, and/or surface tension of the fluids to which it is fluidly connected. Moreover, each variable orifice assembly 154 may be adjusted independently of the other variable orifice assemblies 154 such that greater or lesser amounts of the partitioned input flow are allocated to each respective dip tube 28.

Control 122 also includes control box 124 and control box cover or lid 126 which are similar to control box 24 and cover 26 shown in FIGS. 2-5. Control box 124 is configured and adapted to sealingly receive cover 126 over its open end, thereby providing splash-proof protection of the contents of the enclosure, including PCB 130 and pressure transducers 134, when cover 126 is secured to box 124. An indicator light 127 may be provided to give an externally-visible signal of one or more statuses of control 122. Indicator light 127 may protrude through an opening in cover 126, and be sealingly engaged with such opening to preserve the splash-proof protection of box 124 and cover 126.

Although control 22 is illustrated with a set of twelve non-adjustable pressure regulating orifices 54 and control 122 is illustrated with a set of twelve adjustable pressure regulating orifices 154, it is contemplated that other arrangements may be utilized with the scope of the present disclosure. For example, fewer or greater than twelve orifices may be used as needed to correspond with fewer or greater numbers of containers 44. Non-adjustable pressure regulating orifices 54 and adjustable pressure regulating orifices 154 may both be used in connection with a single installation of monitor 20, as required or desired for a particular application. Additionally, or alternatively, a variable-flow valve or step solenoid may be disposed along the input manifold conduit (e.g., conduit 50), such that the flow available to all the dip tubes 28 may be controlled by a single adjustment.

Each dip tube 28 is connected to a terminal fitting 58 having a geometry sized and shaped to anchor dip tube 28 to base or floor 62 of bulk container 44 without blocking flow through the exit orifice 60. Exit orifice 60 is positioned by terminal fitting 58 near floor 62 of bulk container 44, e.g., 2 centimeters or less from floor 62 of bulk container 44.

Air pressure exiting each pressure regulating orifice 54 accesses a length of pneumatic tubing 42 together with a length of sensor conduit 64 positioned within control box 24, as shown in FIG. 5. Each sensor conduit 64 terminates at a pressure transducer 34 mounted on PCB 30. With each sensor conduit 64 in fluid communication with a corresponding length of pneumatic tubing 42, the back pressure of the liquid level of in bulk container 44 can be measured and compared to ambient (in the case of the open top or vented bulk containers 44 exemplified herein). Closed top or otherwise sealed bulk containers may also be utilized, in which case the back pressure is compared to the pressure in the headspace of each bulk container 44 to determine the fluid level in each bulk container.

More particularly, the air pressure in each length of pneumatic tubing 42 and the corresponding sensor conduit 64 supplied by each corresponding pressure regulating orifice 54 is greater than the possible back pressure created by the corresponding bulk container 44 when it is full of liquid additive. Therefore, airflow will constantly escape the corresponding terminal fitting 58 and bubble to the surface of the liquid additive. The pressure remaining in each length of pneumatic tubing 42 and corresponding sensor conduit 64 will be equal to the back pressure in the corresponding bulk container 44. Therefore, each pressure transducer 34 will register the pressure near the bottom of each bulk container 44, from which the height of liquid additive from the floor of the container can be calculated.

To determine the height of liquid additive in each bulk container, the relationship: Height of Liquid=Back Pressure/(Density of Liquid×gravity) is utilized. Alternatively, pressure can be measured in or converted to units of inches water column. In this instance, the relationship: Height of Liquid=Back Pressure/Specific Gravity of Liquid is used. The calculation can also account for the spacing of exit orifice 60 from floor 62 of each bulk container 44 by simply adding this height to the solution of the above equation.

Each bulk container 44 will contain a liquid additive, i.e., chemical to be applied during a vehicle wash. For example, each bulk container 44 may contain one of the following categories of liquid additives: presoaks, bug washes, glass cleaners and vision guards, tire and wheel/rim cleaners and dressings, soaps, shampoos, foams including conditioners and polishes, detergents, waxes, drying agents, rinse agents, clear coats, paint sealants, protectants, underbody sprays and rust inhibitors, rain coats, etc. These chemicals may be stored in aqueous solution in each bulk container 44 for later mixing with additional water for further dilution of the same before application to the vehicle being washed. In a typical car wash installation, all or several of the containers 44 will contain a liquid additive different from all or several of the other containers. As illustrated in FIG. 1, each bulk container 44 is fluidly connected to car wash apparatus 66 (car wash "apparatus" denotes the brushes, nozzles, etc. used to distribute the car wash additives to a vehicle) and distributed via, e.g., nozzle 68. A mixer 70 may be positioned intermediate each bulk container 44 and car wash apparatus 66 to mix the additives contained in each bulk container 44 with additional water prior to being distributed to a vehicle by car wash apparatus 66. Car wash apparatus 66 and monitor are all part of a larger "car wash," which may be a drive-in, tunnel, or hand wash.

PCB 30 carries processor 72 and memory 74. Memory 74 will contain the density of each additive to be stored in a bulk container 44 as well as the constant for gravity (9.8 m/s$^2$, or simply the specific gravity of each additive to be stored in a bulk container 44). If desired, memory 74 may also contain the distance of exit orifice 60 from floor 62 (this information may also be excluded, if this level is considered to be "empty"). This information will be communicated to processor 72 together with the back pressure determined by each pressure transducer 34. With this information, processor 72 will be capable of continuously calculating the height of additive in each bulk container 44 (either relative to floor 62 or the height of exit orifice 60).

In addition, memory 74 may contain additional information about each additive to be stored in a bulk container 44, such as thixotropy, foaming potential, and/or surface tension. This additional information may be communicated to processor 72. Processor 72 may be programmed to adjust an orifice size corresponding to a particular container 44, with smaller orifice sizes corresponding to higher values for thixotropy, foaming potential, and/or surface tension, and vice-versa.

Processor 72 will further be capable of forecasting (e.g., time to run-out at current short- or long-term average run rate), predictive maintenance (e.g., uneven usage, no movement in one product), product ordering (potentially automatic, with email/web server 76 integration with the controller), long/short-term averaging for cost analysis, and even granular data on chemical usage per wash type (for example) to potentially identify additional maintenance issues. Processor 72 is communicatively connected to web server 76 to allow for remote interface with processor 72. In some embodiments, a user interface may also be provided for user interaction with processor 72 and/or memory 74. For example, a user may be able to specify an identity or properties for a chemical to be associated with a particular container 44. Thresholds may also be set or modified by the user. Such thresholds may include container levels which trigger product ordering protocols, lead time for order delivery, and orifice size (either absolute, or as a function of other parameters as described above). For orifice size adjustments, processor 72 may be programmed with a series of protocols corresponding to varying levels of gas flow and velocity. Each of these protocols may be given a particular identifier such as "A," "B," "C," and so on, and a user may select from among the protocols.

In the form illustrated in FIGS. 1-9, the present disclosure provides individualized pressure sensors 34 in a central control box 24. In an alternative form of the present disclosure, individual pressure sensors and even individual processors can be provided at each chemical container. An exemplary alternative configuration with a control box associated with each chemical container is illustrated in FIGS. 10-12.

Referring to FIGS. 10-12, each bulk container 44' has an individual control box 78 secured to the exterior of the bulk container 44'. Each individual control box 78 houses a T fitting 80 having three intersecting passages. The top passages of the T fitting (i.e., the 2 nominally colinear passages in the fitting) are in fluid communication with air supply conduit 82. The base passage of each T fitting (i.e., the passage oriented orthogonal to the other two passages) is selectively in fluid communication with the top passages of each T fitting and with a corresponding dip tube 28'. More particularly, a solenoid valve is positioned within the base passage of each T fitting 80 and selectively blocks fluid flow through the base passage. The solenoid valve is communicatively connected to a controller mounted on individual PCB 84. The controller is operable, e.g., programmed, to control the solenoid valve to selectively allow fluid communication between supply conduit 82 and dip tube 28'.

Source/regulator of pressurized gas 86 provides airflow and consistent airflow pressure to a first T fitting 80 and then to the next subsequent T fitting 80 in order. A portion of that airflow is diverted to each T fitting base passage when the associated solenoid valve is opened. Adequate pressure to overcome the back pressure of all connected bulk containers 44' when full may be provided by source/regulator of pressurized gas, in which case the level of all bulk containers 44' may be determined at once. Alternatively, the solenoid valves in each T fitting may be communicatively connected to a central controller to allow only a certain one(s) of the solenoid valves to be open at one time, e.g., as few as only one open at a time.

A pressure sensor such as a pressure transducer is positioned in each T fitting downstream of the solenoid valve and communicatively connected to the local controller on individual PCB 84 and/or to the central controller. When the solenoid valve associated with a T fitting is open, an airflow at a pressure sufficient to overcome the back pressure within the associated bulk container 44' flows through exit orifice 60', with the bubbling effect described above. The pressure sensor is then able to provide a readout of the pressure near the bottom of the relevant bulk container 44', as described above with respect to the first embodiment. With this information the local and/or central controllers are able to calculate the height of additive in the relevant bulk container 44', as described above with respect to the first embodiment (with the relevant controller(s) able to access memory containing the density of the relevant additive, the constant for gravity, and the height of exit orifice 60' from floor 62'(if desired)). In alternative embodiments, the memory will store the specific gravity of each additive to be stored in a bulk container 44 instead of the density and constant for gravity.

In the alternative embodiment of FIGS. 10-12, a solenoid may be associated with the terminal end of the pneumatic tubing extending from the last individual control box in the chain downstream from the base passage of the relevant T fitting to allow "burping," i.e., purging of any entrained air, in the line before measurements are taken. The central controller may control this solenoid or another local controller may be provided.

Generically, the measurement devices of the present disclosure are referred to as "bubblers."

While this invention has been described as having exemplary designs, the present invention may be further modified with the spirit and scope of this disclosure. Further, this application is intended to cover such departures from the present disclosure as come within known or customary practice in the art to which this invention pertains.

What is claimed is:

1. A car wash, comprising:
   a plurality of containers, each of the plurality of containers containing a liquid additive for dispensing in the car wash;
   a source of a pressurized gas;
   a manifold receiving a flow of the pressurized gas and partitioning the flow of the pressurized gas into a plurality of partitioned flows;
   a plurality of dip tubes, each dip tube extending into one of the plurality of containers and terminating at an exit orifice near a floor of a corresponding one of the plurality of containers, each of the partitioned flows distributed by the manifold to a corresponding one of the plurality of dip tubes and exiting the one of the plurality of dip tubes at the exit orifice of the one of the plurality of dip tubes,
   a plurality of pressure sensors, each of the plurality of pressure sensors in fluid communication with a corresponding one of the plurality of dip tubes and operable to sense a sensed pressure of the one of the plurality of dip tubes, whereby each of the plurality of pressure sensors senses a back pressure in a corresponding one of the plurality of containers; and
   a processor receiving the sensed pressure from each of the plurality of dip tubes and programmed to calculate a height of the liquid additive in each of the plurality of containers.

2. The car wash of claim 1, wherein each of the plurality of pressure sensors comprises a pressure transducer.

3. The car wash of claim 1, wherein each of the plurality of containers is a vented bulk container.

4. The car wash of claim 1, wherein the source of the pressurized gas comprises a pressure regulator.

5. The car wash of claim 1, wherein the manifold comprises a pressure relief valve.

6. The car wash of claim 1, wherein the manifold comprises a distribution conduit in fluid communication with the source of the pressurized gas to receive the flow of the pressurized gas, the manifold further comprising a plurality of pressure regulating orifices in fluid communication with the distribution conduit, each of the plurality of pressure regulating orifices in fluid communication with a corresponding one of the plurality of dip tubes, each of the plurality of pressure regulating orifices respectively positioned intermediate the distribution conduit and a corresponding one of the plurality of dip tubes.

7. The car wash of claim 6, wherein each of the plurality of pressure regulating orifices provides a substantially equal flow rate therethrough.

8. The car wash of claim 6, further comprising at least one adjustable flow metering valve, wherein at least one of the plurality of pressure regulating orifices provides a variable flow rate therethrough.

9. The car wash of claim 8, wherein the variable flow rate is manually adjustable.

10. The car wash of claim 9, wherein the variable flow rate is adjustable by a needle valve which is configured to be advanced or retracted relative to a valve seat by adjustment of a screw.

11. The car wash of claim 8, wherein the variable flow rate is automatically adjustable.

12. The car wash of claim 11, wherein the processor is programmed to electronically adjust the automatically adjustable variable flow rate.

13. The car wash of claim 6, further comprising an enclosure housing a printed circuit board supporting the processor, the plurality of pressure sensors mounted on the printed circuit board for communication with the processor.

14. The car wash of claim 13, wherein the manifold is mounted to the enclosure, the car wash further comprising a plurality of sensor conduits, each of the plurality of sensor conduits in fluid communication with a corresponding one of the plurality of dip tubes, each of the plurality of sensor conduits in fluid communication with the distribution conduit downstream from a corresponding one of the plurality of pressure regulating orifices, each of the plurality of pressure sensors in fluid communication with a corresponding one of the plurality of sensor conduits, the plurality of sensor conduits housed in the enclosure.

15. The car wash of claim 1, wherein the processor is communicatively connected to a web server to facilitate remote communication of the height of the liquid additive in each of the plurality of containers.

16. The car wash of claim 1, wherein the liquid additive in a first one of the plurality of containers comprises at least one of a presoak, a bug wash, a glass cleaner and vision guard, a tire cleaner or dressing, a wheel/rim cleaner or dressing, a soap, a shampoo, a foam including conditioner or polish, a detergent, a wax, a drying agent, a rinse agent, a clear coat, a paint sealant, a protectant, an underbody rust inhibitor, a rain coat, and another car wash fluid.

17. The car wash of claim 16, wherein the liquid additive in a second one of the plurality of containers comprises another of a presoak, a bug wash, a glass cleaner and vision guard, a tire cleaner or dressing, a wheel/rim cleaner or dressing, a soap, a shampoo, a foam including conditioner or polish, a detergent, a wax, a drying agent, a rinse agent, a clear coat, a paint sealant, a protectant, an underbody rust inhibitor, a rain coat, and another car wash fluid.

18. The car wash of claim 17, wherein the liquid additive in a third one of the plurality of containers comprises yet another of a presoak, a bug wash, a glass cleaner and vision guard, a tire cleaner or dressing, a wheel/rim cleaner or dressing, a soap, a shampoo, a foam including conditioner or polish, a detergent, a wax, a drying agent, a rinse agent, a clear coat, a paint sealant, a protectant, an underbody rust inhibitor, a rain coat, and another car wash fluid.

19. A method of operating a car wash system, the method comprising:
   placing a plurality of dip tubes into a corresponding plurality of containers, each of the plurality of containers containing liquid additive for dispensing in the car wash system, each of the plurality of dip tubes extending into a corresponding one of the plurality of containers and terminating at an exit orifice near a floor of the one of the plurality of containers;
   connecting the plurality of dip tubes to a source of a pressurized gas;
   partitioning a flow of the pressurized gas into a plurality of partitioned flows each flowing to a corresponding one of the plurality of dip tubes;
   measuring a pressure within each of the plurality of dip tubes with one of a plurality of pressure sensors, each of the plurality of pressure sensors in fluid communication with a corresponding one of the plurality of dip tubes and operable to sense a sensed pressure of the one of the plurality of dip tubes, whereby each of the plurality of pressure sensors senses a back pressure in a corresponding one of the plurality of containers, such that a back pressure in each corresponding one of the plurality of containers is determined; and calculating a height of the liquid additive in each of the plurality of containers.

20. The method of claim 19, further comprising varying at least one of the plurality of partitioned flows using a variable pressure orifice operably disposed between the source of the pressurized gas and at least one of the plurality of dip tubes.

21. The method of claim 20, wherein the step of varying is based on at least one of a thixotropy of the liquid additive, a foaming potential of the liquid additive, and a surface tension of the liquid additive.

22. The method of claim 21, wherein the step of varying comprises varying an orifice size of the variable pressure orifice inversely to at least one of the thixotropy of the liquid additive, a foaming potential of the liquid additive, and a surface tension of the liquid additive.

\* \* \* \* \*